(12) United States Patent
Molaire et al.

(10) Patent No.: US 7,211,359 B2
(45) Date of Patent: May 1, 2007

(54) COATING SOLUTION CONTAINING COCRYSTALS AND OR CRYSTALS OF A CHARGE-GENERATION PIGMENT OR A MIXTURE OF CHARGE-GENERATION PIGMENTS

(75) Inventors: Michel Frantz Molaire, Rochester, NY (US); Lloyd Anthony Lobo, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 404 days.

(21) Appl. No.: 10/836,784

(22) Filed: Apr. 30, 2004

(65) Prior Publication Data

US 2006/0204885 A1    Sep. 14, 2006

(51) Int. Cl.
*G03G 5/06* (2006.01)
(52) U.S. Cl. .................. 430/78; 430/59.4; 430/135
(58) Field of Classification Search .............. 430/78, 430/59.4, 135
See application file for complete search history.

(56) References Cited

U.S. PATENT DOCUMENTS

| | | | | |
|---|---|---|---|---|
| 4,882,427 A | 11/1989 | Enokida et al. | ............ | 540/141 |
| 4,994,566 A | 2/1991 | Mimura et al. | ............ | 540/141 |
| 5,008,173 A | 4/1991 | Mimura et al. | ............ | 430/78 |
| 5,039,586 A | 8/1991 | Itami et al. | ............ | 430/78 |
| 5,055,368 A | 10/1991 | Nguyen et al. | ............ | 430/78 |
| 5,059,355 A | 10/1991 | Ono et al. | ............ | 252/584 |
| 5,112,711 A | 5/1992 | Nguyen et al. | ............ | 430/58 |
| 5,132,197 A | 7/1992 | Iuchi et al. | ............ | 430/76 |
| 5,166,339 A | 11/1992 | Duff et al. | ............ | 540/141 |
| 5,194,354 A | 3/1993 | Takai et al. | ............ | 430/58 |
| 5,206,359 A | 4/1993 | Mayo et al. | ............ | 540/141 |
| 5,238,764 A | 8/1993 | Molaire et al. | ............ | 430/58 |
| 5,238,766 A | 8/1993 | Molaire et al. | ............ | 430/78 |
| 5,614,342 A | 3/1997 | Molaire et al. | ............ | 430/78 |
| 5,766,810 A * | 6/1998 | Molaire et al. | ............ | 430/78 |
| 7,011,919 B2 * | 3/2006 | Molaire et al. | ............ | 430/78 |

OTHER PUBLICATIONS

Paul M. Borsenberger and David S. Weiss, *Organic Photoreceptors for Imaging Systems*, 1993, pp. 338-339, Marcel-Dekker, Inc., New York.

* cited by examiner

*Primary Examiner*—John L Goodrow
(74) *Attorney, Agent, or Firm*—Carl F. Ruoff

(57) ABSTRACT

A method for preparing a coating solution containing a cocrystallized titanyl phthalocyanine-titanyl fluorophthalocyanine, the method comprising: dry milling a charge-generation pigment or mixtures of charge-generation pigments; increasing the amorphousness of the pigment mixture as determined by X-ray crystallography using X-radiation characteristic of Cu Kα at a wavelength of 1.541 Å of the Bragg angle 2θ to provide an amorphous pigment mixture; contacting the amorphous pigment mixture with a first organic solvent having a $gamma_c$ hydrogen bonding parameter of less than 9, with or without the presence of a dispersant material, to produce a crystalline pigment of the charge-generation pigment prior to contacting the pigment with a second organic solvent having a $gamma_c$ hydrogen bonding parameter greater than 9; mixing at least one of a second organic solvent, a dispersant and a binder with the crystalline pigment/first solvent mixture without isolating the crystalline pigment to produce a mixture; and, adjusting the concentrations of the first organic solvent, crystalline pigment, binder, dispersants and second organic solvent as required to produce the coating solution of a selected composition.

25 Claims, No Drawings

COATING SOLUTION CONTAINING COCRYSTALS AND OR CRYSTALS OF A CHARGE-GENERATION PIGMENT OR A MIXTURE OF CHARGE-GENERATION PIGMENTS

FIELD OF THE INVENTION

This invention relates to a method for producing a coating solution containing cocrystals and/or crystals of a charge-generation pigment or mixture of charge-generation pigments such as unsubstituted titanyl phthalocyanine and titanyl fluorophthalocyanine for use in the production of electrophotographic elements and related materials. The invention comprises a more efficient method for producing the coating solution from the pigment cocrystals.

BACKGROUND OF THE INVENTION

In electrophotography an image comprising a pattern of electrostatic potential (also referred to as an electrostatic latent image) is formed on a surface of an electrophotographic element comprising at least two layers: a photoconductive layer and an electrically conductive substrate. The electrostatic latent image can be formed by a variety of means, for example, by imagewise radiation-induced discharge of a uniform potential previously formed on the surface. Typically, the electrostatic latent image is then developed into a toner image by contacting the latent image with an electrographic developer. If desired, the latent image can be transferred to another surface before development.

Among the many different kinds of photoconductive materials, which have been employed in electrophotographic, elements are phthalocyanine pigments such as titanyl phthalocyanine and titanyl tetrafluorophthalocyanine. Electrophotographic recording elements containing such pigments as charge-generation materials are useful in electrophotographic laser beam printers because they are capable of providing good photosensitivity in the near infrared region of the electromagnetic spectrum that is in the range of 700–900 nm.

The photoconductive layer is produced from a liquid coating composition that includes the titanyl phthalocyanine pigment and a solvent solution of polymeric binder. It is necessary that the titanyl phthalocyanine pigment be in a form, either crystalline or amorphous, that is highly photoconductive and sufficiently and stably dispersed in the coating composition to permit its being applied at a low enough concentration to form a very thin layer having high electrophotographic speed in the near infrared range. A variety of methods have been used to produce suitable forms of titanyl phthalocyanine. Different methods have commonly produced titanyl phthalocyanines having differing crystallographic characteristics (U.S. Pat. No. 5,166,339 issued to Duff, et al presents a table of polymorphs of unsubstituted titanyl phthalocyanine (also referred to as "TiOPc") in which materials bearing multiple designations are grouped as four types. Many types of TiOPc and other phthalocyanines are discussed in Organic Photoreceptors for Imaging Systems, P. M. Borsenberger and D. S. Weiss, Marcel Dekkar, Inc., New York, pp. 338–391).

In one group of preparations, commonly referred to as "acid pasting", crude titanyl phthalocyanine is dissolved in an acid solution, which is then diluted with non-solvent to precipitate the titanyl phthalocyanine product. In another group of preparations, the crude titanyl phthalocyanine is milled, generally with particular milling media. Some preparations combine techniques or modify a previously prepared titanyl phthalocyanine.

U.S. Pat. No. 5,132,197 issued to Iuchi, et al teaches a method in which titanyl phthalocyanine was acid pasted, treated with methanol and milled with ether, monoterpene hydrocarbon, or liquid paraffin to produce a titanyl phthalocyanine having main peaks of the Bragg angle 2θ with respect to X-rays of Cu Kα 9.0°, 14.2°, 23.9°, (all +/−0.2°).

U.S. Pat. No. 5,206,359 issued to Mayo, et al teaches a process in which titanyl phthalocyanine produced by acid pasting is converted to type IV titanyl phthalocyanine from type X by treatment by halobenzene.

U.S. Pat. No. 5,059,355 issued to Ono, et al teaches a process in which TiOPc was shaken with glass beads producing an amorphous material having no substantial peaks by X-ray diffraction. The amorphous material was stirred with heating in water and ortho-dichlorobenzene. Methanol was added after cooling. A crystalline material was produced which had a distinct peak at 27.3°.

U.S. Pat. No. 4,882,427 issued to Enokida, et al teaches a material having noncrystalline titanyl phthalocyanine and pseudo-non-crystalline titanyl phthalocyanine. The pseudo-noncrystalline material could be prepared by acid pasting or acid slurrying. The noncrystalline titanyl phthalocyanine could be prepared by acid pasting or acid slurrying followed by dry or wet milling or by mechanical milling for a long time without chemical treatment.

U.S. Pat. No. 5,194,354 issued to Takai, et al teaches that amorphous titanyl phthalocyanine prepared by dry pulverization or acid pasting can be converted, by stirring in methanol, to a low crystalline titanyl phthalocyanine having strong peaks of the Bragg angle 2θ with respect to X-rays of Cu Kα 7.2°, 14.2°, 24.0° and 27.2°, (all +/−0.2°). The low crystalline material, it was indicated, could be treated with various organic solvents to produce crystalline materials: methyl cellosolve or ethylene glycol for material having strong peaks at 7.4°, 10.9° and 17.9°; propylene glycol, 1,3-butanediol or glycerin for materials having strong peaks at 7.6°, 9.7°, 12.7°, 16.2° and 26.4°; and aqueous mannitol solution for materials having strong peaks at 8.5° and 10.2° (all peaks +/−0.2°).

U.S. Pat. Nos. 4,994,566 and 5,008,173 issued to Mimura et al teach a process in which non-crystalline particles produced by acid pasting or slurrying then mechanical grinding, mechanical grinding for a very long time or sublimination are treated with tetra hydrofuran to produce titanyl phthalocyanine having infrared absorption peaks at 1,332; 1,074; 962; and 783 $cm^{-1}$.

U.S. Pat. No. 5,039,586 issued to Itami teaches acid pasting followed by milling in aromatic or haloaromatic solvent with or without additional water or other solvents such as alcohols or ethers, at 20°–100° C. In an example, crude titanyl phthalocyanine was milled with alpha-chloronaphthalene or ortho-dichlorobenzene as milling medium followed by washing with acetone and methanol. The titanyl phthalocyanine produced had a first maximum intensity peak of the Bragg angle 2θ with respect to X-rays of Cu Kα at a wavelength of 1.541Å at 27.3°+/−0.2° and a second maximum intensity peak at 6.8°+/−0.2°. This was contrasted with another titanyl phthalocyanine which was similarly milled but not acid pasted. This material had a maximum intensity peak at 27.3°+/−0.2° and a second maximum intensity peak in the 6–8° range at 7.5°+/−0.2°.

U.S. Pat. No. 5,055,368 issued to Nguyen, et al teaches a "salt-milling" procedure in which crude titanyl phthalocyanine is milled, first under moderate shearing conditions, along with milling media comprising inorganic salt and non-conducting particles. The milling is then continued at higher shear and temperatures of up to 50° C. until the pigment undergoes a perceptible color change. Solvent is substantially absent during the milling steps.

U.S. Pat. No. 4,701,396 issued to Hung, et al teaches near infrared sensitive photoconductive elements made from fluorine-substituted titanyl phthalocyanine pigments. While phthalocyanines having only fluorine substituents and those being equal in number on each aromatic ring, are the preferred pigments of that invention described in this patent, various non-uniformly substituted phthalocyanines are taught.

U.S. Pat. Nos. 5,238,764 and 5,238,766, both of which are issued to Molaire, et al, teach that titanyl fluorophthalocyanine products of acid-pasting and salt-milling procedures, unlike unsubstituted titanyl phthalocyanine, suffer a significant reduction in near infrared sensitivity when they are dispersed in a solvent such as methanol or terahydrofuran, which has a $gamma_c$ hydrogen bonding parameter value greater than 9. These patents further teach that this reduction in sensitivity can be prevented by first contacting titanyl fluorophthalocyanine with a material having a $gamma_c$ hydrogen bonding parameter of less than 8.

U.S. Pat. No. 5,614,342 to Molaire, et al discloses a method for producing cocrystals of unsubstituted titanyl phthalocyanine and titanyl fluorophthalocyanine compositions and methods and electrophotographic elements utilizing the compositions. The method disclosed provides a cocrystalline mixture.

U.S. Pat. No. 5,112,711 to Nguyen, et al teaches an electro-photographic element having a physical mixture of titanyl phthalocyanine crystals and titanyl fluorophthalocyanine crystals. The element provided a synergistic increase in photosensitivity in comparison to an expected additive combination of titanyl phthalocyanine and titanyl fluorophthalocyanine. Similar elements having physical mixtures combining titanyl phthalocyanine crystals and chloro or bromo-substituted titanyl phthalocyanine crystals produced results in which the photosensitivity was close to that of the least sensitive of the two phthalocyanines used.

Even when the mixture of cocrystals of titanyl phthalocyanine and titanyl fluorophthalocyanine compositions is produced, the processes used for the production of a coating solution containing the cocrystals have been less efficient than desired. The processes previously used have been relatively time consuming and relatively expensive. Accordingly, a continued effort has been directed to the development of a process for more efficiently producing a coating solution from mixtures of cocrystals.

SUMMARY OF THE INVENTION

The present invention provides a method for preparing an electrophotographic element coating solution containing a crystallized charge-generation pigment material, the method comprising: dry milling a crude charge-generation pigment material to produce a finely-divided amorphous pigment material; contacting the amorphous pigment material with a first solvent having a $gamma_c$ hydrogen bonding parameter less than 9 and optionally a dispersant material to produce a finely-divided crystalline charge-generation pigment; and, mixing a binder and a second solvent with the charge-generation crystalline pigment without isolating the crystalline pigment to produce the coating solution.

The present invention further comprises a method for preparing an electrophotographic element coating solution containing a crystallized charge-generation pigment material selected from the group consisting of titanyl phthalocyanine, titanyl fluorophthalocyanine, and mixtures thereof, the method comprising: dry milling a crude charge-generation pigment material to produce a finely-divided amorphous pigment material; contacting the amorphous pigment material with a first solvent having a $gamma_c$ hydrogen bonding parameter less than 9 and optionally a dispersant material to produce a finely-divided crystalline charge-generation pigment; and, mixing a binder and a second solvent with the charge-generation crystalline pigment without isolating the crystalline pigment to produce the coating solution.

The invention further comprises a method for preparing an electrophotographic element coating solution containing a crystallized charge-generation pigment material, the method comprising: dry milling a crude charge-generation pigment material to produce a finely-divided amorphous pigment material; contacting the amorphous pigment material with a first solvent having a $gamma_c$ hydrogen bonding parameter greater than 9 and optionally a dispersant material to produce a finely-divided crystalline charge-generation pigment; and, mixing a binder and a second solvent with the charge-generation crystalline pigment without isolating the crystalline pigment to produce the coating solution.

DESCRIPTION OF PREFERRED EMBODIMENTS

As disclosed in U.S. Pat. No. 5,614,342 issued Mar. 25, 1997 to Michel F. Molaire and Jeanne E. Kaeding, which is hereby incorporated in its entirety by reference, it is disclosed that a physical mixture of crude unsubstituted titanyl phthalocyanine and titanyl fluorophthalocyanine (crude pigment mixture) can be converted to a composition of matter comprising a substantially amorphous, i.e., low crystalline titanyl phthalocyanine mixture (amorphous pigment mixture). The crude pigment mixture is converted to a substantially amorphous state by dry milling to produce a dry milled amorphous pigment mixture. The amorphous pigment mixture is then contacted with an organic solvent having a $gamma_c$ hydrogen bonding parameter of less than 8 to produce a high crystalline material (cocrystal product or cocrystal), which is used in the charge generation layer of an electrophotographic element.

Unsubstituted titanyl phthalocyanine has the structural formula:

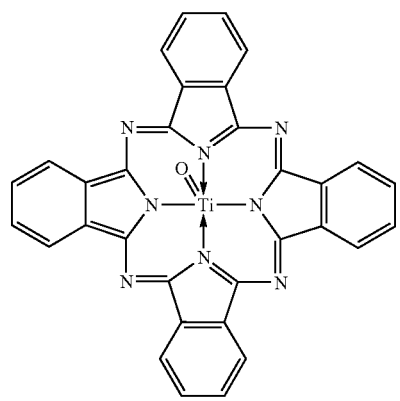

The titanyl fluorophthalocyanines used in the invention have the general structure:

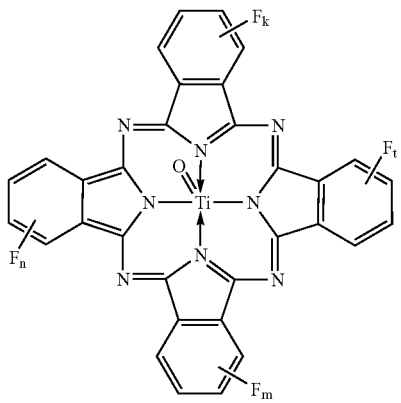

wherein each of k, l, m and n is independently an integer from 1 to 4. In a particular embodiment of the invention, the crystalline titanyl fluorophthalocyanine consists of a mixture comprising titanyl 2,9,16,23-tetra-fluorophthalocyanine, titanyl 2,9,16-trifluorophthalocyanine, 2-monotitanyl fluorophthalocyanine; titanyl 2,9-difluorophthalocyanine; and titanyl 2,16-difluorophthalocyanine.

The composition of the mixtures and their electrophotographic properties can be manipulated through varying the weight ratio of the fluorophthalocyanines (where n=1 to 99% is the weight ratio of the fluorophthalocyanine). The characteristics of the phthalocyanines combined to form the crude mixture are determined by the desired photogeneration characteristics of the final product. A mixture of fluorophthalocyanines can be used as long as the total percent of phthalocyanines is consistent to the formula: $100-X=Y>0$, where Y is the percent of unsubstituted phthalocyanine.

The crude titanyl phthalocyanine and titanyl fluorophthalocyanine are first admixed together. The crude materials can be synthesized by a number of well-known procedures, for example, the procedures described in U.S. Pat. No. 4,701,396. As synthesized, titanyl phthalocyanine pigments normally have a particle size that is too large for them to be effectively used in electrophotographic applications. In this condition, they are known in the art as "crude" pigments. Such crude pigments normally have a particle size in excess of 10 micrometers, often a particle size of at least 50 micrometers, and in some cases, at least 1 micrometers. The term "particle size" is used herein to refer to the largest dimension of an individual particle and the median value of the same parameter for the particles of a particulate. Particle size can be readily determined from electron photomicrographs using techniques well known to those skilled in the art.

After admixing the crude pigment mixture is rendered amorphous. The crystallographic characteristics discussed herein, i.e., amorphousness and crystallinity are based upon X-ray defraction spectra at the Bragg angle 2θ using Cu Kα X-radiation at a wavelength of 1.541 Å and are +/−0.2° unless otherwise indicated. Suitable X-ray diffraction techniques are described in Engineering Solids, T. S. Hutchinson and D. C. Baird, John Wiley and Sons, Inc. 1963 and X-ray Diffraction Procedures for Polycrystalline and Amorphous Materials, $2^{nd}$ Ed., John Wiley and Sons, Inc. 1974.

In the method for preparing the cocrystal product of the invention, dry milling is the preferred procedure for rendering the crude pigment mixture amorphous, although other techniques can be used. For example, the crude pigment mixtures can be acid pasted or salt milled; however, these procedures have the shortcomings previously discussed.

In dry milling, the crude pigment mixture is mechanically ground in the dry state under shear conditions that break up particle agglomerates, reduce the particle size and render the mixture less crystalline, i.e., more amorphous. It is preferred that dry milling be continued until the pigment mixture is rendered substantially or fully amorphous. The term "fully amorphous," as used herein, refers to a crystalline/amorphous state in which the well defined peaks of the crude phthalocyanine are replaced by a very high baseline response modulated by a few very broad, 5–10° or wider peaks.

The dry milling procedure is carried out in the substantial absence of any solvent or polymeric binder or salt. That is, if there are any of these materials present the amount is so small as to have no effect or at least no adverse effect on the pigment amorphous characteristics.

Milling apparatus capable of providing the necessary shear are well known and include conventional ball mills, roll mills, paint shakers, vibrating mills and the apparatus described in U.S. Pat. Nos. 4,555,467 and 4,785,999. The shear employed is varied, as well known to those skilled in the art, depending upon such factors as the type of milling apparatus, milling aids such as steel balls and the crude pigment mixture used. The energy applied in the first milling stage generally does not exceed about 5 watts and is typically from about 3 to 5 watts. Enough energy is applied to convert the crude pigment mixture to a low crystallinity pigment mixture.

The milling apparatus used during the dry milling state may or may not require the use of particulate milling aids, which are materials added to the pigment particles to increase the shear and decrease milling time. Particulate milling aids are materials that can be easily removed from the milled pigment mixture. For example, the salts described as milling aids in U.S. Pat. No. 5,055,368 are not desirable for use as particulate milling aids because the salts themselves are degraded to very small size by milling and must be removed by extensive washing. Examples of preferred particulate milling aids are steel shot, ceramic glass and zirconia media. These aids typically are available in sizes from about 0.5 to about 5 millimeters in diameter. Typically the concentration of the pigment mixture during milling is from about 0.1 to 5 weight percent relative to the total weight of the pigment mixture and the milling media.

The dry milling time will vary greatly depending upon a number of factors such as relative proportions of pigment mixture and milling aid and the specific milling equipment used. Generally a suitable time for the dry milling stage may be as much as 240 hours with typical times being in the range of from about one-half to 120 hours.

Milling tends to result in the liberation of heat, which would raise the temperature of the milled composition. It is desirable that the milling apparatus include temperature regulating means which can help increase or decrease the temperature up to a temperature below the decomposition temperature of the phthalocyanine pigments or preferably in the range of about 0° to about 150° C. or more preferably from about 40° to about 100° C.

In a particular embodiment of the invention, the milling is performed in a roll mill. Stainless steel beads, 3 mm in diameter are added as a milling media on a 99.174 weight/weight percent basis relative to the weight of the pigment mixture. The pigment mixture is milled for a time period of from 12 to 96 hours at temperatures within the range of 25 to 60° C.

Under the same dry milling conditions, the crude pigment mixture has been found to dry mill faster than either unsubstituted titanyl phthalocyanine alone or titanyl fluorophthalocyanine alone. Although the method of the present invention is useful with either method alone.

The amorphous pigment mixture produced by dry milling has a photosensitivity, especially to red and near-infrared radiation, comparable to that of the corresponding acid pasted or salt milled material. The fully amorphous pigment mixture of the present invention shows only three very broad peaks of the Bragg angle at 7.2°, 15.4°, and 25.5° (all +/−0.2°).

The cocrystal product is produced by contacting the amorphous pigment mixture with an organic solvent having a $gamma_c$ hydrogen bonding parameter value less than 9, or preferably less than 8, before the pigment mixture comes into contact with any organic solvent having a $gamma_c$ hydrogen bonding parameter value greater than 9.

Unpredictably, the cocrystal product exhibits a distinctive crystallogram having major peaks of the Bragg angle 2θ with respect to X-rays of Cu Kα at a wavelength of 1.541 Å at 7.4°, 10.1°, 12.7°, 13.2°, 14.9°, 15.9°, 17.4°, 18.6°, 22.4°, 24.3°, 25.6°, and 28.8°, all +/−0.2°. This distinctive spectrum is clearly seen over a weight:weight ratio of unsubstituted titanyl phthalocyanine to titanyl fluorophthalocyanine of from 95:5 to 30:70. X-ray diffraction spectra outside this range are in accord with an explanation that the crystalline product in those instances is a combination of exhibiting the same peaks and crystal of unsubstituted titanyl phthalocyanine or titanyl fluorophthalocyanine.

The crystallogram of the cocrystal product is different than the crystallograms of highly crystalline titanyl fluorophthalocyanine prepared in the same manner as the cocrystal (dry milled then converted with the same solvent). The crystallogram is also different than the crystallogram of a physical mixture of highly crystalline unsubstituted titanyl phthalocyanine and titanyl fluorophthalocyanine prepared in the same manner as the cocrystal. The cocrystal product most closely resembles highly crystalline unsubstituted titanyl phthalocyanine prepared in the same manner as the cocrystal (dry milled then converted with the same solvent).

The distinctive spectrum is surprising. Even more surprising is that the cocrystal product of the present invention exhibits substantially improved electrophotographic sensitivity over either titanyl fluorophthalocyanine or the unsubstituted titanyl phthalocyanine prepared in the same manner. The cocrystal product can provide electrophotographic elements that are very fast and have reasonably low dark decay. For example, in particular embodiments of the invention, dark decay for electrophotographic elements using the cocrystal is lower than that for similar elements using the unmilled, untreated mixtures of U.S. Pat. No. 5,112,711.

$Gamma_c$ hydrogen bonding parameter values of organic solvents can be determined by the method reported in "A Three-Dimensional Approach to Solubility," J. D. Crowley, G. S. Teague and J. W. Lowe, Journal of Paint Technology, Vo. 38, No. 496, May 1966, pp 269–280 and further described in CRC Handbook of Solubility Parameters and Other Cohesion Parameters, A Barton, CRC Press, Boca Raton, Fla., 1983, pp. 174 and 179–180 and in the ASTM D3132 standard test method. The method comprises measuring the effect of the solvent on deuterated methanol in terms of the frequency of the infrared radiation absorbed by the O-D bond of deuterated methanol and comparing that effect to the effect of benzene on the same bond. The value of the $gamma_c$ hydrogen bonding parameter for the solvent being tested is then determined in accordance with the equation:

$$gamma_c = \{(nu_{benzene}) - (nu_{solvent})\}/10$$

wherein "$nu_{benzene}$" is the wave number (expressed as $cm^{-1}$) or the infrared radiation absorbed by the O-D bond of deuterated methanol in contact with benzene and "$nu_{solvent}$" is the wave number of the infrared radiation absorbed by the O-D bond of deuterated methanol in contact with the solvent being tested. $Gamma_c$ hydrogen bonding parameter values of numerous organic solvents have been determined. A list of some common solvents is presented in Table 1.

TABLE 1

| SOLVENT | GAMMA$_C$ HYDROGEN BONDING PARAMETER VALUE |
|---|---|
| benzene | 0.0 |
| dichloromethane | 1.5 |
| 1,1,2-trichloroethane | 1.5 |
| chlorobenzene | 1.5 |
| dichloropropane | 1.5 |
| chloroform | 1.5 |
| ethylene chloride | 1.5 |
| toluene | 4.5 |
| xylene | 4.5 |
| acetonitrile | 6.3 |
| methyl benzoate | 6.3 |
| anisole | 7.0 |
| diethyl ketone | 7.7 |
| methyl ethyl ketone | 7.7 |
| methyl isobutyl ketone | 7.7 |
| acetone | 9.7 |
| butyrolactone | 9.7 |
| dioxane | 9.7 |
| tetrahydrofuran | 9.9 |
| cyclohexanone | 11.7 |
| N,N-dimethylformarnide | 11.7 |
| 2-ethoxyethanol | 13.0 |
| ethanol | 18.7 |
| methanol | 18.7 |
| butanol | 18.7 |
| pyridine | 18.1 |
| ethylene glycol | 20.6 |

Any convenient procedure can be used to treat the amorphous pigment mixture with an organic solvent having a $gamma_c$ hydrogen bonding parameter value less than 8. For example, the pigment mixture can be contacted with vapors of the solvent, mixed well with liquid solvent or milled in mixture with the solvent and a milling aid such as steel shot. (Milling in the presence of a solvent is also referred to herein as "wet milling"). Wet milling is a convenient procedure since it assures adequate mixing. A suitable duration for wet milling depends on the intensity or energy of milling and is usually from about 10 minutes to about 96 hours. In some embodiments, convenient times are from about 30 to about 90 minutes.

If it is not objectionable to retain a small amount of solvent having a $gamma_c$ value less than 8 in a coating solution composition, the most convenient procedure can be milling the amorphous pigment mixture with the solvent, a desired polymeric binder, a dissolved dispersant and any desired milling aid. The proportions of the amorphous pigment mixture and binder can be adjusted so that a desired coating composition can be prepared by removal of any milling aid and dilution with the primary solvent for the coating composition (generally a solvent such as tetrahydrofuran, which has a $gamma_c$ hydrogen bonding parameter value greater than 9). The inventors consider that the use of the dispersant during the conversion stage improves the adsorption of the dispersant material on the pigment surface and produces a superior coating dispersion.

For the purpose of preserving high photosensitivity of the cocrystal, it does not matter whether the cocrystal remains in contact with some of the solvent having a $gamma_c$ value less than 8 or is completely separated from such solvent after the treatment. In either case, the cocrystal provides the advantage of being able to withstand contact with a solvent having a $gamma_c$ value greater than 9 without appreciable degradation in photosensitivity.

The amount of solvent having a $gamma_c$ value less than 8 that is brought into contact with the amorphous pigment mixture is not critical, however, the amount should preferably be large enough to allow continuous contact of all surfaces of the amorphous phalocyanine particles with the solvent during the treatment in order to maximize treatment uniformity and efficiency. Agitating or stirring a dispersion of the amorphous pigment mixture particles in liquid solvent during the treatment facilitates contact of all surfaces of the particles with the solvent. It appears that solvents with $gamma_c$ values less than 7 enable more efficient treatment (in general, the lower the $gamma_c$ value the more efficient the treatment. It is therefore preferred that the organic solvent having a $gamma_c$ hydrogen bonding parameter value less than 8, that is employed for the treatment be an organic solvent having a $gamma_c$ hydrogen bonding parameter value less than 7.

The duration of the contact between the amorphous pigment mixture and the solvent having a $gamma_c$ value less than 9, necessary to maximize the beneficial effect of the treatment, will vary depending upon a variety of factors including the nature of the pigment mixture and the solvent, particle size and shape, the procedure employed to effect the contact and temperature. It is generally convenient to convert the amorphous pigment mixture to the cocrystal product at room temperature; however, elevated temperatures can be used to speed conversion. The following are example of conversion procedures that are convenient for some embodiments of the present invention. The amorphous pigment mixture can be mixed with a liquid organic solvent having a $gamma_c$ value less than 9 and ultrasonically agitated at 60° C. for 2 hours. The amorphous pigment mixture can be wet milled with a liquid organic solvent having a $gamma_c$ value less than 9 for 2 days without any external application of heat.

While the reasons or mechanism for the beneficial effect of the contact with solvent having a $gamma_c$ value less than 9 are not understood, it does appear that the treatment establishes a certain crystalline structure in the pigment mixture which is not adversely affected by subsequent contact with an organic solvent having a $gamma_c$ hydrogen bonding parameter value greater than 9.

Electrophotographic elements can be of various types, including both those commonly referred to as single layer or single-active-layer elements and those commonly referred to as multi-active or multi-active-layer elements. Such electrophotographic elements have multiple layers since each element has at least an electrically conductive layer and one photogenerating (charge generation) layer, that is, a layer which includes as a charge generation pigment material, a composition of matter including the pigments discussed above.

In the coating composition, the optimum ratio of titanyl phthalocyanine cocrystal to binder or of cocrystal and charge transport material to binder may vary widely depending on the particular materials employed. In general, useful results are obtained when the total concentration of both titanyl phthalocyanine and charge transport material in a layer is within the range of from about 0.01 to about 90 weight percent based on the dry weight of the layer. In a preferred embodiment of a single active layer electrophotographic element of the invention, the coating composition contains from about 10 to about 70 weight percent of a charge-transport agent and from 0.01 to about 20 weight percent of the cocrystal of the invention. In a preferred embodiment of a multiple active layer electrophotographic element of the invention, the coating composition contains from about 0 to about 50 weight percent of a charge-transport agent and from 0.01 to about 80 weight percent of the cocrystals.

Single-active-layer elements are so named because they contain only one layer that is active both to generate and to transport charges in response to exposure to actinic radiation. Such elements have an additional electrically conductive layer in electrical contact with the photoconductive layer. In single-active-layer elements of the invention, the photoconductive layer contains titanyl phthalocyanine cocrystals as charge-generation material to generate electron/hole pairs in response to actinic radiation and an charge-transport material, which is capable of accepting the charges generated by the charge-generation material and transporting them through the layer to effect discharge of the initially uniform electrostatic potential. The charge-transport agent and titanyl phthalocyanine cocrystal are dispersed as uniformly as possible in the photoconductive layer. The photoconductive layer also contains an electrically insulative polymeric film-forming binder. The photoconductive layer is electrically insulative except when exposed to actinic radiation.

Multiactive layer elements are so named because they contain at least two active layers, at least one of which is capable of generating charge, that is, electron/hole pairs in response to exposure to actinic radiation and is therefore referred to as a charge-generation layer (CGL) and at least one of which is capable of accepting and transporting charges generated by the charge-generation layer and is therefore referred to as a charge-transport layer (CTL). Such elements typically comprise at least an electrically conductive layer, a CGL and a CTL. Either the CGL or the CTL is in electrical contact with both the electrically conductive layer and the remaining CTL or CGL. The CGL contains the cocrystal of the invention as charge-generation material and a polymeric binder. The CTL contains a charge-transport agent and a polymeric binder.

Single-active-layer and multiactive layer electrophotographic elements and their preparation and use in general are well known and are described in more detail for example in U.S. Pat. Nos. 4,701,396; 4,666,802; 4,578,334; 4,719,163; 4,175,906; 4,514,481 and 3,615,414.

In preparing electrophotographic elements, the components of the photoconductive layer (in single-active-layer elements) or CGL (in multiactive layer elements) including binder and any desired addenda are dissolved or dispersed together in a liquid to form an electrophotographic coating composition which is then coated over an appropriate underlayer, for example, a support of electrically conductive layer. The liquid is then allowed or caused to evaporate from the mixture to form the permanent photoconductive layer or CGL. The cocrystal product can be mixed with the solvent solution of a polymeric binder immediately or can be stored for some period of time before making up the coating composition.

The polymeric binder used in the preparation of the coating composition can be any of the many different binders that are useful in the preparation of electrophotographic layers. The polymeric binder is a film-forming polymer having a fairly high dielectric strength. In a preferred embodiment of the invention, the polymeric binder also has good electrically insulating properties. The binder should provide little or no interference with the generation and transport of charges in the layer. The binder can also be selected to provide additional functions. For example, adhering a layer to an adjacent layer or as a top layer, providing a smooth, easy to clean and wear-resistant surface.

Representative binders are film-forming polymers having a fairly high dielectric strength and good electrically insulating properties. Such binders include for example styrene-butadiene copolymers; vinyl toluene-styrene copolymers; styrene-alkyl resins; silicone-alkyl resins; soya-alkyd resins; vinylidene chloride-vinyl chloride copolymers, poly(vinylidene chloride) vinyl chloride-acrylonitrile copolymers; vinyl acetate-vinyl chloride copolymers; poly(vinyl acetals), such as poly(vinyl butyral); nitrated polystyrene; poly(m-ethylstyrene); isobutylene polymers; polyesters, such as poly{ethylene-coakylenebis(alkyleneoxyaryl)phenylenedicarboxylate}; phenol-formaldehyde resins; ketone resins; polyamides; polycarbonates; polythiocarbonates; poly{ethylen-co-isopropyliden-2,2-bis(ethylenoxyphenylene)-terephthalate}; copolymers of vinyl haloacrylates and vinyl acetate such as poly(vinyl-m-bromobenzoate-covinyl acetate); chlorinated poly(olefins), such as chlorinated poly(ethylene), cellulose derivates such as cellulose acetate, cellulose acetate butyrate and ethyl cellulose; and polyimides, such as poly(1,1,3-trimethyl-3-(4'-henyl)-5-indane pyromellitimide}. Examples of binder polymers, which are particularly desirable from the viewpoint of minimizing interference with the generation or transport of charges, include bisphenol A, polycarbonates and polyesters such as poly[(4,4'-norbornylidene)diphenylene terephthalate-co-azelate].

Suitable organic solvents for forming the polymeric binder solution can be selected from a wide variety of organic solvents, including for example, aromatic hydrocarbons such as benzene, toluene, xylene and mesitylene; ketones such as acetone, butanone and 4-methyl-2-pentanone; halogenated hydrocarbons such as dichloromethane, trichloroethane, methylene chloride, chloroform and ethylene chloride; ethers including ethyl ether and cyclic ethers such as dioxane and tetrahydrofuran; other solvents such as acetonitrile and dimethylsulfoxide; and mixtures of such solvents. The amount of solvent used in forming the binder solution is typically in the range of from about 2 to about 100 parts of solvent per part of binder by weight and preferably in the range of from about 10 to 50 parts of solvent per part of binder by weight.

Polymeric binders useful for the CGL or photoconductor layer can also be used in producing a CTL. Any charge transport material can be utilized in such elements. Such materials include inorganic and organic (including monomeric organic, metallo-organic and polymeric organic materials); for example zinc oxide, lead oxide, selenium, phthalocyanine, perylene, arylamine, polyarylalkane and polycarbazole materials among many others. The CTL can be solvent coated or can be produced in some other manner, for example by vacuum deposition.

CGL's and CTL's in elements can optionally contain other addenda such as leveling agents, surfactants, plasticizers, sensitizers, contrast control agents and release agents, as is well known to the art.

Various electrically conductive layers or supports can be employed in electrophotographic elements of the present invention, for example, paper (at a relative humidity above 20 percent) aluminum-paper laminates; metal foils such as aluminum foil, zinc foil and the like; metal plates such as aluminum, copper, zinc, brass and galvanized plates; vapor deposited metal layers such as silver, chromium, vanadium, gold, nickel, aluminum and the like; and semiconductive layers such as cuprous iodide and indium tin oxide. The metal or semiconductive layers can be coated on paper or conventional photographic film base such as poly(ethylene terephthalate), cellulose acetate, polystyrene, etc. Such conducting materials as chromium, nickel, etc can be vacuum-deposited on transparent film supports in sufficiently thin layers to allow electrophotographic elements so prepared to be exposed from either side.

Such electrophotographic elements can include various additional layers known to be useful in electrophotographic elements in general, for example, subbing layers, overcoat layers, barrier layers and screening layers.

While the invention has been described by reference to mixtures and cocrystals of titanyl phthalocyanine and titanyl fluorophthalocyanine, it should be noted that the present invention is useful with either of these materials or other pigments which can be rendered amorphous and recrystallized. Further the present invention is useful with such materials, which are recrystallized using solvents having a $gamma_c$ hydrogen bonding parameter greater tan 9.

In the production of coating solutions used to deposit the crystal or cocrystal product on an electrophotographic element, a process has been used which comprises mixing crude unsubstituted titanyl phthalocyanine and/or crude titanyl fluorophthalocyanine to produce a crude pigment mixture; increasing the amorphousness of the pigment mixture as determined by X-ray crystallography using X-radiation characteristic of Cu Kα at a wavelength of 1.541 Å of the Bragg angle 2θ to provide an amorphous pigment mixture; contacting the amorphous pigment mixture with a first organic solvent having a $gamma_c$ hydrogen bonding parameter of less than 9 to produce a crystalline cocrystal product. The cocrystal product was then produced as a dried product by removing the first solvent or retained with minimal amounts of the first solvent as a first solvent wet cocrystal product. When it was desired to produce the coating solution, the dried cocrystal product or first solvent wet cocrystal product was mixed with an additional quantity of the first solvent or more typically a second organic solvent having a $gamma_c$ hydrogen bonding parameter greater than 9 to produce a mixture. The mixture was then mixed with a binder and other additives and milled to produce a coating solution, which contained the cocrystal product as particles having an average particle size less than about 0.25 microns. Desirably, the size is less than 0.1 microns. This coating mixture was then used to coat electrophotographic elements.

Typically the first solvent/amorphous pigment requires milling, ultrasonic mixing or the like to intimately contact the first solvent and amorphous pigment to convert the amorphous pigment to crystalline pigment. When the crystallized pigment is isolated by drying or removal of some of the first solvent for storage, the crystallized pigment must be milled again when it is mixed with a binder, added solvents, dispersant and the like to produce the coating solution.

The coating solution required milling to break up conglomerates or other larger particles of crystal or cocrystal product, which is typically present after the isolation of the crystal or cocrystal product as a dried product or as a first solvent wet product. This results in an extended milling time to produce the amorphous pigment mixture, the crystalline pigment and a further extended milling period to produce the coating solution.

According to the present invention, the first solvent wet crystal or cocrystal mixture is produced by mixing the first solvent having a $gamma_c$ hydrogen bonding parameter less than 9 with the amorphous pigment or amorphous pigment mixture. Desirably, according to the present invention, a dispersant in an amount from about 1 to about 15 wt. % based upon the solids in the mixture is added at this point for mixture with the first solvent and the amorphous pigment or amorphous pigment mixture. Applicants consider that the presence of the dispersant material in the crystal conversion stage is beneficial in facilitating adsorption of the dispersant material on the surface of the pigment and facilitating the formation of a superior coating dispersion. Upon conclusion of the mixing of the first solvent with the finely-divided amorphous pigment, either by wet milling, ultrasonic contacting or the like, the present invention requires that in lieu of isolating the crystals and cocrystals as a dry product or as a first solvent wet product, a binder and optionally an additional solvent and additional dispersant be added to the mixture so that the already milled mixture can be further milled if necessary to intimately mix the components to produce the coating solution. This eliminates one of the milling steps. Further, the use of dispersant is considered to improve the ultimate product produced. The added second solvent can be the same as or different than the first solvent.

Alternatively, it is known that the use of solvents having a $gamma_c$ hydrogen bonding parameter greater than 9 produce crystals in a similar fashion, albeit crystals that may have a lower infrared sensitivity. Crystals can be produced with the solvents having a $gamma_c$ hydrogen bonding parameter greater than 9 by the method discussed above.

As well known, after initial contact with the solution solvent having a $gamma_c$ hydrogen bonding parameter less than 9, a second organic solvent can be used with the crystallized materials. This is commonly done in adjusting the parameters of the coating solution to desired ranges. Such solvents can also be used as discussed above in combination with the materials present in the mixture used for the production of the finely divided crystal or cocrystalline mixture.

In the wet milling step for the crystal or cocrystal product, it is desirable that the cocrystal product is present in the mix in an amount from about 20 to about 80 weight percent and preferably from about 50 to about 70 weight percent. This mixture may contain, as indicated, binders, dispersants, solvents other than the solvent having a $gamma_c$ hydrogen bonding parameter less than 9 and the cocrystals. The initial solvent contact must be with the solvent having a $gamma_c$ hydrogen bonding parameter less than 9 if the crystals having a higher activity are desired. The mixture percentages do not include the weight percent of the steel balls or other materials used as milling aids.

The dispersing agent may be any suitable dispersing agent. Suitable dispersants comprise substituted ammonium salts of a colored acid wherein from 16 to 60 carbon atoms are contained in at least three chains attached to the nitrogen atom of the substituted ammonium ion. The dispersant may also comprise a polymeric material having a plurality of pendant quaternary ammonium salt groups. Particularly suitable dispersing agents are shown in U.S. Pat. Nos. 5,536,611 and 4,057,436, which are hereby incorporated in their entirety by reference. Particularly suitable dispersants are polyvinyl formal, polyvinyl acetal, and polyvinylbutyrals, including the S-LEC polyvinylbutyrals from Sesikui Chemical Co, LTD, BL-1, BL-1H, BL-2, BL-2H, BL-5, BL-10, BL-S, BL-SH, BX-L, BM-1, BM-2, BM-5, BM-S, BM-SH, BH3, BH-6, BH-A, BH-S, BX-1, BX-3, BX-5, KS-10, KS-1, KS-3, KS-5. The BUTVAR polyvinyl butyrals from Solutia, including B-76, B72, B74. The polymeric dispersants from BYK Chemie, including the DISPERBYK series. Other examples of dispersants suitable for pigment stabilization in organic media are surfactants made from the acetylenic diol based surfactants sold under the trade name of SURFYNOLS and carboxylated polymeric surfactants sold under the trade name SOLSPERSE. The above-mentioned surfactants are mainly to serve as examples of dispersants and the application is not limited to these materials. The dispersant is preferably mixed with the amorphous pigment and the first solvent in an amount from about 5 to about 60 weight percent based upon the solids weight of the mixture (not including any milling balls, etc).

By the addition of these dispersants to the amorphous pigment mixture/first solvent mixture prior to or during milling, the effectiveness of the dispersant is increased with no detriment to the formation of the cocrystalline pigments. The cocrystal/first solvent mixture is then mixed with a second solvent, which may or may not have a $gamma_c$ hydrogen bonding parameter below 9, a binder, additional dispersant as required and optionally other additives as desired. At this point, the mixture may be adjusted by the addition of additional binders, solvents, other desired additives and the like to produce a coating solution of the desired consistency and properties. Many binders as known to those skilled in the art and as discussed previously, may be used.

Typically the coating solution is adjusted to have a cocrystal content from about 1 to about 10, and preferably from about 1 to about 6, weight percent. The adjustment of the quantities of binder, organic solvent and other additives is well known to those skilled in the art to produce a desired coating solution. The coating is produced to have desired properties for binding to a second layer and the like as known to those skilled in the art for specific applications as known to those skilled in the art.

The finely divided crystalline pigment, solvent, binder and dispersant are adjusted to produce a coating solution having a crystalline product content from about 20 to about 80, and preferably from about 40 to about 70, weight percent based upon the weight of the total solids of the coating solution; a binder content from about 19 to about 65 weight percent based upon the weight of the total solids of the coating solution and a dispersant content from about 1 to about 30, and preferably about 5 to about 15 weight percent based upon the weight of the total solids of the coating solution; a solvent content from about 98 to about 80 weight percent based upon the weight of the coating solution.

If a second solvent is used in the process, the amount of the first solvent having a $gamma_c$ hydrogen bonding parameter less than 9 remaining on the cocrystal is not detrimental.

Typically the amount of solvent having a $gamma_c$ hydrogen bonding parameter less than 9 remaining on the cocrystal of the product has been a quantity up to about 20 weight percent.

According to the present invention, the first solvent is not removed after conversion of the materials to a crystalline form but rather the cocrystal/first solvent mixture is further milled with the additional components and typically the weight percent of the pigment and the binder are adjusted to approximately equal quantities.

While the present invention has been discussed with reference to titanyl phthalocyanine and titanyl fluorophthalocyanine, the invention is equally adaptable to any charge generation pigments which may be rendered amorphous by milling or the like and thereafter reconverted to a crystalline form using a solvent. Solvents having a gamma$_c$ hydrogen bonding parameter less than about 9 have been effective to produce crystals of a desired configuration, which have a high photosensitivity.

Similarly, the process of the present invention, while it has been described by reference to a cocrystal system is equally useful with single crystal systems and the like.

The process of the present invention has eliminated several steps, including filtering, drying and milling with a considerable savings of time, effort and expense to produce the coating solution. Further, the properties of the coating solution have been improved by the use of the dispersant at an early stage to ensure better adsorption of the dispersant material on the pigment particles surface.

The coating solution can thus be produced with only two milling steps, whereas previously three milling steps were utilized. This represents a substantial reduction in time, effort and expense required to produce a coating solution and produces a coating solution having better properties for coating electrophotographic elements by reason of the presence of the dispersant. Therefore, the present invention is effective to much more economically and efficiently produce coating solutions containing crystalline or cocrystalline products than the methods previously known and used.

The invention is more fully illustrated in the following examples.

Preparation of Crude Unsubstituted Titanyl Phthalocyanine—Preparation 1

Phthalonitrile (1280 g), benzamide (1512.5 g), xylene (1250 ml) and pentanol (1052 g) were added in this order into a 12 L 3-neck-round-bottom flask equipped with a temperature probe and a temperature controller, a condenser and paddle stirrer. After the stirrer was started, titanium (IV) butoxide (838 g), and xylene (1000 ml) were added. The reaction mixture was heated to reflux (144° C.) for six hours. The reaction mixture was then cooled to 85° C., filtered through a medium frit sintered glass funnel, rinsed with 4×500 ml toluene, then with 4×500 ml of hot dimethyl formamide. After an overnight soak in dimethyl formamide, the product was refluxed for one hour. The product was further worked up in methanol and acetone, before drying at 70–80° C. overnight. Neutron activation indicated 8.6+/−0.02 wt % Titanium and less than 0.01 wt % chlorine.

Preparation of Crude Titanyl Tetrafluorophthalocyanine—Preparation 2

Fluorophthalonitrile (38.7 grams, 0.267 mole) and titanium tetrachloride (20.7 grams, 0.134 mole) were suspended in 200 ml of 1-chloronaphtalene and heated to 205°+/−5° C. and maintained for 2 hours at this temperature. The reaction mixture was cooled slightly and the dark solid was collected and washed with acetone and methanol. The dark blue solid (34 grams) was refluxed in water several times until the filtrate was neutral. The pigment was rinsed with acetone and methanol and dried to yield crude titanyl tetrafluorophthalocyanine.

EXAMPLE 1

One Step Preparation of Dispersion Containing 75:25 Co-Crystalline Mixture of TiOPc and TiOFPc: Polyvinyl Butyral S-lecBM-2 as a Dispersant.

A 1-gallon-wide mouth glass jar was filled with 9 kgs of 3 mm stainless steel balls, 56.25 grams of TiOPc made from preparation 1, and 18.75 grams TiOFPc made from preparation 2. The jar was put on a roller and roller milled at 85 rpm. The milling was continued for 96 hours, at which time, a small sample was taken and treated in water. That sample was dried and sent for x-ray analysis. The results show that the mixture was fully amorphized. To the bulk of the sample in the jar was added a premixed solution of a polyvinyl butyral S-lecBM-2 (18.75 grams) from Sekisui Chemical Co. LTD of Japan and 1,1,2 trichloroethane (TCE) solvent (1469 grams). The jar was put back on the roller mill and allowed to roll for 72 hours. The beads were then separated from the 1,1,2 TCE pigment dispersion grind. The beads were rinsed with 2 kg of 1,1,2 TCE to recover the rest of the mill grind. The recovered mill grind was then added to a preformed solution of 56.25 grams of the polyester ionomer, made from isophthalic acid (95 mole), 4-sodio-isophthalic sulfonate (5 mole %), diethylene glycol (20 mole %), and neopentyl glycol (80 mole %), and 1380 grams of 1,1,2 TCE. The dispersion was then diluted to 2.3% solids for coating and characterization.

The dispersion was tested for rheology and coated for uniformity and optical density evaluation.

EXAMPLE 2

One Step Preparation of Dispersion Containing 75:25 Co-Crystalline Mixture of TiOPc and TiOFPc: DYSPER-BYK Dispersant.

The procedure of Example 1 was used, except that 18.75 grams of the polyester ionomer "SIP", made from isophthalic acid (95 mole), 4-sodio-isophthalic sulfonate (5 mole %), diethylene glycol (20 mole %), and neopentyl glycol (80 mole %), was used to mill the pigment with 2.25 grams of DYSPERBYK, a polymeric dispersant sold by BYK-Chemie USA. The same letdown procedure was followed.

EXAMPLE 3

One Step Preparation of Dispersion Containing 75:25 Co-Crystalline Mixture of TiOPc and TiOFPc: Polyvinyl Butyral S-lec BM-2 as a Dispersant.

The procedure of example 1 was used up to the dry milling step using two jars. Then both jars were emptied into a SZEGVARI attritor type 1SDG, size 1, manufactured by Union Process, of Akron, Ohio. To the attritor 937.5 g of a 1,1,2 trichloroethane S-Lec BM2 solution (4% Solid) were added. The attritor was then run for 6 hours @ 175 RPM. After the 6 hours milling, the mill grind was drained in a bottle. The beads were rinsed with 500 grams of TCE into the mill grind bottle. The mill grind was added to 2818.5 grams of a 4% of the polyester ionomer "SIP" 1,1,2 trichloroethane solution.

EXAMPLE 4

One Step Preparation of Dispersion Containing 75:25 Crystals of TiOFPc: Polyvinyl Butyral S-lec BM-2 as a Dispersant.

The procedure of Example 3 was used except that the pigment was crystalline TiOFPc prepared in the same manner as Example 1 from crude TiOFPc as the sole pigment.

COMPARATIVE EXAMPLE 1

Two-Step Preparation of Dispersion Containing 75:25 Co-Crystalline Mixture of TiOPc and TiOFPc: Polyvinyl Butyral S-Lec BM-2 as a Dispersant.

Step 1: Co-Crystalline Mixture of TiOPc and TiOFPc 75:25 Preparation

Two 1-gallon-wide mouth glass jars were filled respectively with 9 kgs of 3 mm stainless steel balls, 56.25 grams of TiOPc made from preparation 1, and 18.75 grams TiOFPc made from preparation 2. The jar was put on a roller and milled at 85 rpm. The milling was continued for 96 hours, at which time, a small sample was taken and treated in water. That sample was dried and sent for x-ray analysis. The results show that the mixture was fully amorphized. To the bulk of the sample in the jar was added 1 kilogram of dichloromethane, an organic solvent with a hydrogen gamma$_c$ of 1.5. The mixture was milled for 24 hours. Then the stainless steel beads were separated from the pigment slurry, followed by filtration and drying of the co-crystalline mixture. The isolated pigment was analyzed by X-ray and shown to be a co-crystal of TiOPc and TiOFPc.

Step 2: Preparation of the Dispersion

To a SZEGVARI attritor type 1 SDG, size 1, manufactured by Union Process, of Akron, Ohio, 1314 g of 1,1,2-Trichloroethane and 850 g of a 4 Wt % polyvinyl butyral S-Lec BM-2 in 1,1,2-Trichloroethane, and 136 g. of the co-crystalline mixture from Step 1 were added to the attritor set at 100 RPM. After complete addition of the pigment, the attritor speed was increased to 125 RPM. The mixture was milled for six hours.

Then the content of the attritor was discharged into a tared jar, leaving the stainless steel beads behind. The attritor was rinsed twice with 976 grams of 1,1,2-trichloroethane into the same jar. The recovered mill grind was then added, 2550 g of a 4% of the polyester ionomer made from isophthalic acid (95 mole), 4-sodio-isophthalic sulfonate (5 mole %), diethylene glycol (20 mole %), and neopentyl glycol (80 mole %), in 1,1,2-trichloroethane. To the stirred dispersion, 1.8 gram of the surfactant DC-510 from Dow Corning was added. The dispersion was finally filtered with a 40 microns Pall filter.

COMPARATIVE EXAMPLE 2

Two-Step Preparation of Dispersion Containing Crystals of TiOFPc: Polyvinyl Butyral S-Lec BM-2 as a Dispersant.

Step 1: Preparation of Crystalline TiOFPc

Crystalline TiOFPc was prepared using the same procedure as in the first step of comparative example 1, except that crude TiOFPc was used in place of the mixture.

Step 2: Preparation of the Dispersion

The dispersion of crystalline TiOFPc was prepared using the same procedure as in comparative example 1, except that the crystalline TiOFPc was used in place of the Co-Crystalline mixture.

The rheology of the materials prepared by the two processes is very similar, with the one-step process giving slightly more shear thinning behavior. The pictures of the coatings are shown at the side of the respective graphs—the top section is from the untreated solution and the bottom is from the sonicated solution. Both materials show fine grain with improvement in the dispersion appearance upon sonication. The rheology curves also show that the dispersion quality improves upon sonication with the overall viscosity dropping.

Samples made with 75/25 cocrystal. One sample was made with one step conversion and the other in the two-step or conventional way. Both samples were milled, after conversion, on the a SZEGVARI attritor type 1 SDG, size 1, manufactured by Union Process, of Akron, Ohio. The 4% solids sample was diluted to different levels and then coated and measured for rheology.

With the 75/25 cocrystal too, the one step process gives a slightly more shear thinning rheological profile. The photomicrographs of the coating show that the grain is quite low.

Here too, the top picture is a coating from an untreated solution and the bottom picture is from the sonicated solution. Solutions made from both procedures (2 step and 1 step) improve with respect to dispersion quality, upon sonication, as observed by the drop in the solution viscosity.

The rheological and coating behavior of solutions made by both methods behave similarly. The key to obtaining good dispersion quality is the milling in the presence of the PVB stabilizer. The major advantage is that the one-step procedure is less cumbersome and more environmentally friendly.

The coating behavior of these solutions containing pigment, depends on the dispersion quality and the rheological properties of the solution. A well-dispersed pigment results in rheological behavior that is Newtonian (viscosity independent of shear rate), or mildly shear thinning. A poor dispersion results in agglomerates of the pigment and the rheological behavior exhibits high shear thinning behavior, particularly at low shear rates. The rheological properties of the solutions prepared by the one-step process, of the instant invention were Newtonian and similar to the solutions prepared by a two step process wherein the converted cocrystal was isolated from solution before introducing to binders, dispersant and solvent. Thus, the quality of the dispersion produced by the current invention is at least equal to or better than the quality of dispersion produced in a two-step process.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A method for preparing an electrophotographic element coating solution containing a crystallized charge-generation pigment material, the method comprising:
   a) dry milling a crude charge-generation pigment material to produce finely divided amorphous pigment material wherein the crystalline charge-generation pigment material is selected from the group consisting of titanyl phthalocyanine, titanyl fluorophthalocyanine, and mixtures thereof;
   b) contacting the amorphous pigment material with a first solvent to produce a finely-divided crystalline charge-generation pigment, optionally in the presence of a dispersant material; and,
   c) mixing a binder and a second solvent with the charge-generation crystalline pigment without isolating the crystalline pigment to produce the coating solution, the second solvent being the same or different than the first solvent.

2. The method of claim 1, wherein the first solvent has a gamma$_c$ hydrogen bonding parameter less than 9.

3. The method of claim 1, wherein said contacting is in the presence of a dispersant material.

4. The method of claim 1, wherein the gamma hydrogen bonding parameter is less than 8.

5. The method of claim 1, the gamma$_c$ hydrogen bonding parameter is less than 7.

6. The method of claim 3, wherein the dispersant is selected from the group consisting of substituted ammonium salt of a colored acid wherein from 16 to 60 carbon atoms are contained in at least three chains attached to the nitrogen atom of the substituted ammonium ion, polymeric materials having a plurality of pendant quaternary ammonium salt groups, polyvinyl formal, polyvinyl acetal, polyvinylbutyral and combinations thereof.

7. The method of claim 3, wherein the dispersant is selected from the group consisting of polyvinyl formal, polyvinyl acetal, polyvinylbutyral.

8. The method of claim 3, wherein the dispersant is polyvinylbutyral.

9. The method of claim 3, wherein the dispersant is the sole binder used in the coating solution.

10. The method of claim 3, wherein the binder is a polyester ionomer.

11. The method of claim 3, wherein the binder is a polyester ionomer made from isophthalic acid (95 mole), 4-sodio-isophthalic sulfonate (5 mole %), diethylene glycol (20 mole %), and neopentyl glycol (80 mole %).

12. The method of claim 3, wherein the dispersant is mixed with the amorphous pigment and the first solvent in an amount equal to from about 5 to about 60 weight percent based on total solids in the mixture.

13. The method of claim 12, wherein the amorphous pigment, the first solvent and the dispersant are wet milled to produce the crystalline pigment.

14. The method of claim 1, wherein the finely divided crystalline pigment, solvent, binder and dispersant are adjusted to produce a coating solution having a crystalline product content from about 20 to about 80 weight percent based upon the weight of the total solids of the coating solution; a binder content from about 19 to about 65 weight percent based upon the weight of the total solids of the coating solution and a dispersant content from about 1 to about 15 weight percent based upon the weight of the total solids of the coating solution; a solvent content from about 98 to about 80 weight percent based upon the weight of the coating solution.

15. The method of claim 14, wherein the binder content is from about 40 to about 70 weight percent based upon the total solids in the coating solution.

16. The method of claim 14, wherein the dispersant content is from about 5 to about 30 weight percent based upon the total solids in the coating solution.

17. The method of claim 1, wherein the amorphous pigment material, first solvent and dispersant are wet milled to produce finely divided crystallized pigment having a particle size less than about 0.5 micron.

18. The method of claim 1, wherein the dispersant is mixed with the amorphous pigment and first solvent in an amount equal to from about 40 to about 70 weight percent based on the total solids in the coating solution.

19. The method of claim 18, wherein the amorphous pigment, the first solvent and the dispersant are wet milled to produce the crystalline pigment.

20. A method for preparing an electrophotographic element coating solution containing a crystallized charge-generation pigment material, the method comprising:
 a) dry milling a crude charge-generation pigment material to produce a finely divided amorphous pigment material wherein the crude-generation pigment material is titanyl phthalocyanine, titanyl fluorophthalocyanine, or mixtures thereof;
 b) mixing the finely divided amorphous pigment material with a solvent having a gamma hydrogen bonding parameter less than 9, a binder and a dispersant to produce the coating solution containing crystallized pigment material.

21. The method of claim 20, wherein the pigment material, binder, solvent and dispersant are wet milled to produce the coating solution.

22. The method of claim 20, wherein the finely divided crystalline pigment, solvent, binder and dispersant are adjusted to produce a coating solution having a crystalline product content from about 20 to about 80 weight percent based upon the weight of the total solids of the coating solution; a binder content from about 19 to about 65 weight percent based upon the weight of the total solids of the coating solution and a dispersant content from about 1 to about 15 weight percent based upon the weight of the total solids of the coating solution; a solvent content from about 98 to about 80 weight percent based upon the weight of the coating solution.

23. The method of claim 20, wherein a solvent having a $gamma_c$ hydrogen bonding parameter greater than 9 is mixed with the pigment material, binder, solvent and dispersant after the pigment material has been wet by, and crystallized in the presence of the solvent having a $gamma_c$ hydrogen bonding parameter less than 9.

24. A method for preparing an electrophotographic element coating solution containing a crystallized charge-generation pigment material, the method comprising:
 a) dry milling a crude charge-generation pigment material to produce a finely divided amorphous pigment material wherein the crude charge-generation pigment material is titanyl phthalocyanine, titanyl fluorophthalocyanine, or mixtures thereof;
 b) mixing the finely divided amorphous pigment material with a solvent having a gammac hydrogen bonding parameter greater than 9, a binder and a dispersant to produce the coating solution containing crystallized pigment material.

25. The method of claim 24, wherein the pigment material, binder, solvent and dispersant are wet milled to produce the coating solution.

* * * * *